United States Patent
Brucker et al.

(10) Patent No.: US 10,038,724 B2
(45) Date of Patent: Jul. 31, 2018

(54) ELECTRONIC ACCESS CONTROLS

(71) Applicant: SAP SE, Walldorf (DE)

(72) Inventors: Achim D. Brucker, Sheffield (GB); Helmut Petritsch, Karlsruhe (DE)

(73) Assignee: SAP SE, Walldorf (DE)

( * ) Notice: Subject to any disclaimer, the term of this patent is extended or adjusted under 35 U.S.C. 154(b) by 274 days.

(21) Appl. No.: 14/962,509

(22) Filed: Dec. 8, 2015

(65) Prior Publication Data

US 2017/0163684 A1   Jun. 8, 2017

(51) Int. Cl.
*G06F 21/00* (2013.01)
*H04L 29/06* (2006.01)

(52) U.S. Cl.
CPC .............. *H04L 63/20* (2013.01); *H04L 63/10* (2013.01)

(58) Field of Classification Search
CPC ................................. H04L 63/20; H04L 63/10
See application file for complete search history.

(56) References Cited

U.S. PATENT DOCUMENTS

| | | |
|---|---|---|
| 8,473,505 B2 | 6/2013 | Brucker et al. |
| 8,881,293 B1 | 11/2014 | Brucker et al. |
| 8,959,646 B2 | 2/2015 | Brucker et al. |
| 9,195,841 B2 | 11/2015 | Cras et al. |
| 2007/0133510 A1* | 6/2007 | Da Palma ........... H04L 65/4038 370/352 |
| 2009/0178102 A1* | 7/2009 | Alghathbar ......... G06F 21/6218 726/1 |
| 2011/0314261 A1 | 12/2011 | Brucker et al. |
| 2013/0018842 A1* | 1/2013 | Calippe ................... H04L 67/28 707/609 |
| 2013/0276066 A1* | 10/2013 | Buehl ................... G06F 21/335 726/4 |
| 2014/0068697 A1 | 3/2014 | Brucker et al. |
| 2015/0013011 A1 | 1/2015 | Brucker et al. |
| 2015/0324609 A1* | 11/2015 | Grubel .................... G06F 21/64 726/26 |
| 2017/0093913 A1* | 3/2017 | Summers ................ H04L 63/20 |

* cited by examiner

*Primary Examiner* — Kendall Dolly
(74) *Attorney, Agent, or Firm* — Fish & Richardson P.C.

(57) ABSTRACT

Methods, systems, and apparatus, including computer programs encoded on a computer storage medium, for accessing an electronic access control model and data indicating results of access control requests that have been processed in accordance with an access control policy of the electronic access control model. Identifying a plurality of partitions in the electronic access control model, where each partition represents one or more access criteria of the electronic access control model that, taken together, define a computer executable access privilege. For each partition, determining a number of access control requests processed based on the partition based on the data, assigning an access type to the partition, determining whether modification of a policy underlying the partition would improve the electronic access control model based on the access type of the partition and the number of access control requests processed based on the partition, and, if so, selectively modifying the policy.

18 Claims, 4 Drawing Sheets

ELECTRONIC ACCESS CONTROLS

BACKGROUND

Business enterprise systems form the backbone of most modern enterprises. Consequently, access control systems are becoming more and more important (e.g., for controlling access to data and business processes). Further, the number of businesses that operate in regulated markets (e.g., markets in which compliance regulations are applicable) is increasing. Such compliance regulations, along with the increased awareness of information technology (IT) security, result in a need for flexibility and adaptability in business access control models. In general, this leads to the need for complex and dynamic access control policies as well as a significant increase in the costs for manual system audits.

SUMMARY

Implementations of the present disclosure include methods for improving the efficiency of electronic access controls. In some implementations, methods include actions of accessing an electronic access control model and data indicating results of access control requests that have been processed in accordance with an access control policy of the electronic access control model. Identifying a plurality of partitions in the electronic access control model, where each partition represents one or more access criteria of the electronic access control model that, taken together, define a computer executable access privilege. For each partition, determining a number of access control requests processed based on the partition based on the data, assigning an access type to the partition, determining whether modification of a policy underlying the partition would improve the electronic access control model based on the access type of the partition and the number of access control requests processed based on the partition, and, if so, selectively modifying the policy. Other implementations of this aspect include corresponding systems, apparatus, and computer programs, configured to perform the actions of the methods, encoded on computer storage devices.

These and other implementations can each optionally include one or more of the following features. In some implementations the method can include, for each partition, determining a frequency with which access control requests processed based on the partition based on the number of access control requests processed based on the partition, where the determination of whether modification of the policy underlying the partition would improve the electronic access control model is based on the access type and the frequency of the partition.

In some implementations, the method can include obtaining audit results associated with access control policies of the electronic access control model. For each partition, determining which, if any, of the audit results are associated with the partition, based on whether an audit result is associated with one or more access requests that were processed based on the partition, where the determination of whether modification of the policy underlying the partition would improve the electronic access control model is based on the access type of the partition, the number of access control requests processed based on the partition, and any audit results associated with the partition.

In some implementations, selectively modifying the policy can include one of: a modification to change the access type of the policy from EXCEPTIONAL to PERMIT, a modification to change the access type of the policy from EXCEPTIONAL to DENY, a modification to change a role associated with the policy, or a modification to change the access type of the policy from PERMIT to EXCEPTIONAL.

In some implementations, the method can include providing a recommendation to modify the policy in response to determining that modification of the policy underlying the partition would improve the electronic access control model.

In some implementations, the recommendation can include one of: a recommendation to change the access type of the policy from EXCEPTIONAL to PERMIT, a recommendation to change the access type of the policy from EXCEPTIONAL to DENY, a recommendation to change a role associated with the policy, a recommendation to consider exceptional permissions to a specific role or specific users, or a recommendation to change the access type of the policy from PERMIT to EXCEPTIONAL.

In some implementations, the data indicating results of access control requests having been processed in accordance with the access control policy can be obtained from an access control log.

In some implementations, the data indicating results of access control requests having been processed in accordance with the access control policy can be obtained from an audit log.

In some implementations, the electronic access control model can be a role-based access control model.

In some implementations, at least one partition can include a role and a resource.

In some implementations, the access type can include one of PERMIT, DENY, or EXCEPTIONAL.

In some implementations, the electronic access control model can be a Bell-LaPadula based access control model.

In some implementations, at least one partition can include a clearance level and an object with a classification level The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say, methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include methods for improving the efficiency of electronic access controls. More particularly, implementations of the present disclosure are directed to using information acquired from access logs and audits to adapt the policies in an access control model to the actual uses and needs of an enterprise access system. In some implementations, an access control model for an access system is divided into actionable partitions. For example, access control policies of the model can be partitioned into particular combinations of data based upon which access requests can be evaluated. Each partition can be assigned an access type that indicates how an access request based on the partition would be evaluated by an access control policy of the model. Furthermore, each partition can be evaluated based on data indicating how the partition has actually been used by users of the access system to determine whether, and if so, how a policy underlying the partition should be modified. In some implementations, the policy can be modified in accordance with the findings. Thus, the access control model can be dynamically improved to support the actual business processes required for an access system and its users.

As noted above, modern business enterprise systems are an integral part of most modern enterprises. Consequently, access control systems are increasing in importance for enterprise resource planning (ERP) and customer relationship management (CRM). Further, an increasing number of enterprises operate in regulated markets, in which the enterprise systems are required to comply with regulations (e.g., the Health Insurance Portability and Accountability Act (HIPAA) in the health care sector, Basel II in the financial sector). Such compliance regulations, along with the increased awareness of IT security and rapid changes in business environments result in a need for flexibility and adaptability in business access control models. Adapting the policies underlying access control model to such fast changing requirements is a major challenge.

Dynamic access control models not only define actions that are allowed (resulting in a PERMIT policy decision) and actions that are disallowed (resulting in a DENY policy decision), but also action that can—in exceptional circumstances—be allowed (e.g., resulting in an EXCEPTIONAL policy decision). In some examples, an access control model may include conditions indicating circumstances in which to permit such exceptional accesses. For example, an exceptional access can require a user to confirm the existence of an exceptional situation before granting access. This flexible approach may allow business processes and access controls to be quickly adapted to changing requirements without the need for complicated policy changes. Such exceptional policies can, however, be abused, therefore, necessitating system audits. Knowledge gained form system audits can be harnessed to improve the security of such flexible access control models. As discussed in further detail herein, implementations of the present disclosure use information acquired from access logs and audits to adapt the policies in an access control model to the actual uses and needs of an enterprise access system. For example, knowledge acquired about access system usage and potential access violations can be used to modify access polices to improve the security and flexibility of the access model.

Figure 1:
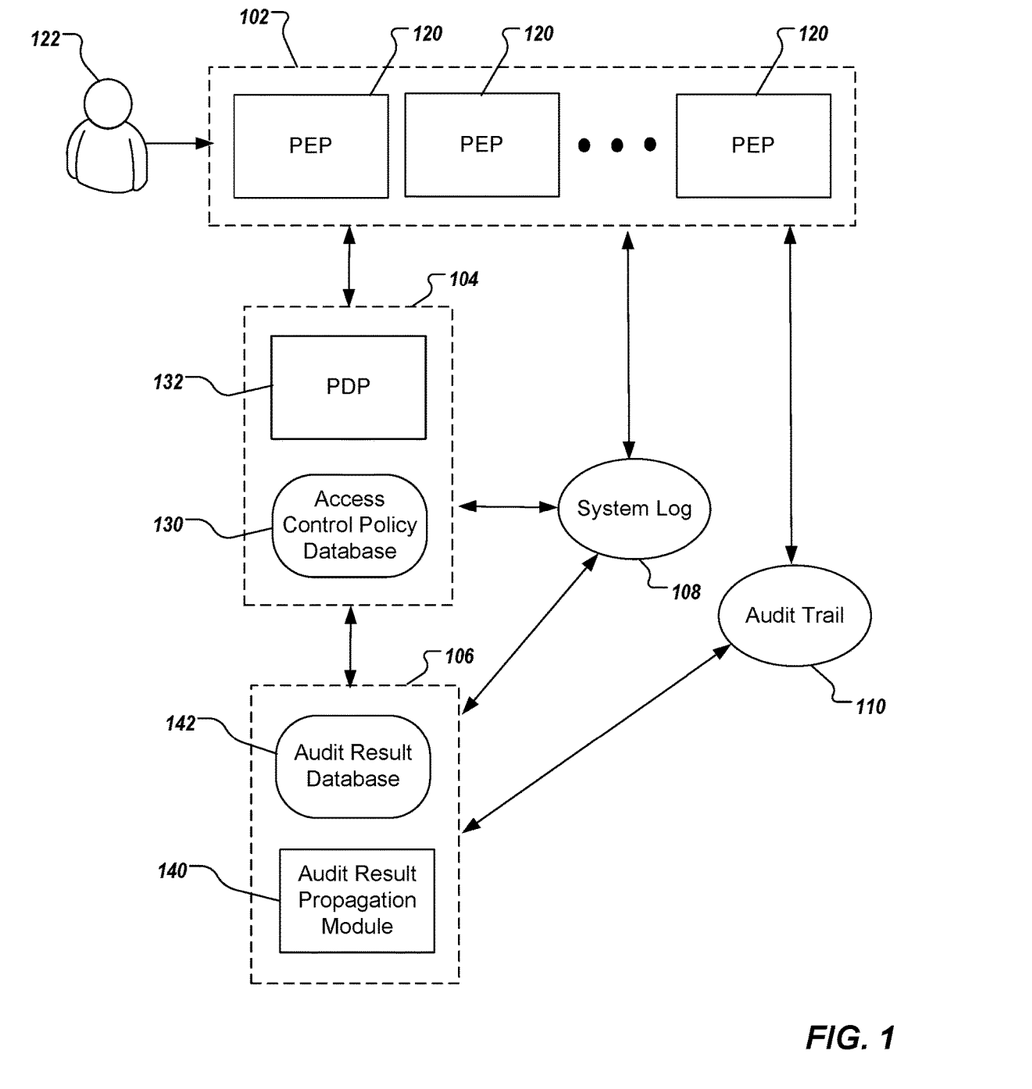
FIG. 1 depicts an example system architecture for executing implementations of the present disclosure.

FIG. 1 depicts an example system architecture 100 for executing implementations of the present disclosure. In some examples, the architecture 100 can be an architecture for an enterprise access control system. The system architecture 100 includes an access control enforcement system 102, an access control decision system 104, a policy audit and modification system 106, a system log 108, and, optionally, an audit trail log 110. As discussed herein, policy audit and modification system 106 evaluates access control policies of the access control decision system 104 based on access request decisions enforced by the access control enforcement system 102. Access request data can be stored in the system log 108 or, in some implementations, an audit trail log 110. Policy audit and modification system 106 processes the access request data to evaluate the security and efficiency of the access control policies and, if necessary, provide access control policy modifications or recommendations for modified polices. In some examples, the policy audit and modification system 106 evaluates access control policies based on audit results in combination with the request data.

In some examples, the system log 108 can be an electronic storage (e.g., file system or a database) that stores the data associated with access requests including, for example, data identifying a request, requesting user identity, requesting user permission levels, type of access requested, or type/identity of a resource to which access was requested. The system log 108 can permit components of the access control enforcement system 102 (e.g., the PEP 120), the access control decision system 104 (e.g., the PDP 132), and the policy audit and modification system 106 (e.g., the audit result propagation module 142) to access (e.g., read and write data) request data in the system log 108.

In some examples, the audit trail log 110 can be an electronic storage (e.g., file system or a database) that stores specialized access request data (e.g., audit results associated with access request data) that is used for access policy audits. The audit trail log 110 can permit components of the access control enforcement system 102 (e.g., the PEP 120), the access control decision system 104 (e.g., the PDP 132), and the policy audit and modification system 106 (e.g., the audit result propagation module 142) to access (e.g., read and write data) request data in the audit trail log 110.

In the depicted example, the access control enforcement system 102 includes multiple policy enforcement points (PEPs) 120. In some examples, the access control enforcement system 102 is provided as one or more computer-executable programs that can be executed using one or more computing devices. The PEPs 120 are components of the access control enforcement system 102 that access control policies. For example, when a user 122 requests access to a particular system resource, a PEP queries the access control decision system 104 to determine whether to grant the user's 122 request. The PEP 120 enforces the access control decision system's 104 decision and either grants or denies the requested access. In some examples, the PEPs 120 log access request enforcement decisions in the system log 108. In some examples, the PEP's 120 log access request enforcement decisions in specialized logs of an audit trail log 110 for policy audits.

In the depicted example, the access control decision system 104 includes an access control policy database 130 and a policy decision point (PDP) 132. In some examples, the access control decision system 104 is provided as one or more computer-executable programs that can be executed using one or more computing devices. The access control decision system 104 receives access requests from the access control enforcement system 102 and provides access decisions based on the system's access control policy. In some examples, the PDP 132 logs access request enforcement decisions in the system log 108.

In some examples, the PDP 132 is a component of the access control decision system 104 that evaluates access control requests and decides whether the request should be granted or not based on the access control policy. For example, when the PDP 132 receives an access request from a PEP 120, the PDP evaluates the request to and identifies an access control policy that is relevant to the request. The PDP 132 then issues a decision to the PEP 120 to grant or deny the request based on the access control policy. In some examples, the PDP 132 logs access request decisions in the system log 108. In some examples, the PDP 132 logs access request decisions in specialized logs of an audit trail log 110 for policy audits.

In some examples, the access control database 130 is an electronic storage system (e.g., a file system) that stores the access control policies of the access control decision system 104. In some examples, the access control database 130 permits the access control polies to be queried, read, and modified.

In the depicted example, the policy audit and modification system 106 includes an audit result propagation module 142 and an audit result database 140. In some examples, the policy audit and modification system 106 is provided as one or more computer-executable programs that can be executed using one or more computing devices. As described in more detail below, the audit and modification system 106 processes the access request data to evaluate the security and efficiency of the access control model 104 and, if necessary, provide access control policy modifications or recommendations for modified polices.

In some examples, the audit result database 140 is an electronic storage system (e.g., a file system) that stores the results of access control policy (system) audits. In some examples, the audit result database 140 permits the audit results to be queried, read, and modified.

In some examples, the audit result propagation module 142 is a component of the policy audit and modification system 106 that evaluates access control polices based on access request data and audit results. For example, the audit result propagation module 142 can evaluate the access control policies stored in the database 130 by a three-part algorithm (e.g., Example Algorithm 1 below). In general, the audit result propagation module 142 can partition the access control policies of the model, based on the concepts of the underlying access control model. For example, polices for a simple role based access control (RBAC) model can be partitioned into roles and resources.

Access request data is obtained (e.g., from system log 108) and assigned to assigned to respective partitions. For example, each access request that is associated with a particular policy partition is assigned to that partition. The access request data is used to determine a number of access requests and access control decisions based on each partition of the access control policy. Each partition is assigned one or more access types (e.g., PERMIT, DENY, EXCEPTIONAL) that indicate how access requests based on the partition have been evaluated by the underlying access control policy (e.g., the request was granted, denied, or granted under exceptional circumstances). For example, the access request data can be used to assign each partition one or more access types based on the actual access controls decisions associated with each partition. In some examples, a partition may be assigned only one access type. In some examples, a partition may be assigned multiple access control types. For example, the access requests based on the partition may be denied 100 times and granted 10 times.

In some examples, audit results are assigned to appropriate partitions of the policy. For example, audit results that are relevant to a particular policy are assigned to partitions associated with that policy. The partitions are categorized based on their access type and the number of requests related to the partition. The categorized partitions can form the basis for determining whether, and if so, how to modify the policies underlying the partitions in order to improve the access control model.

| Example Algorithm 1: Analyzing the ACP and System Log |
| --- |
| 1:   procedure AnalyzePolicy(p : Policy, D : Set(Decision), A : Set(AuditResult)) |
| 2:      PolicyMaps ← { }       -> Step 1: Partition Access Control Policy |
| 3:      if p instanceOf RBAC then |
| 4:         RoleMap ← BuildRoleMap(p) |
| 5:         PolicyMaps ← PolicyMaps ∪ {(Role, RoleMap)} |
| 6:         RessourceMap ← BuildRessourceMap(p) |
| 7:         PolicyMaps ← PolicyMaps ∪ {(Ressource, RessourceMap)} |
| 8:      end if |
| 9:      if p instanceOf DAC then: |
| 10:        ... |
| 11:     end if |
| 12:     if p instanceOf ... then: |
| 13:        ... |
| 14:     end if |
| 15: |
| 16:     GroupedDecisions ← { }    -> Step 2: Assign Access Control Decisions |
| 17:     for all (t, M) ∈ PolicyMaps do |
| 18:        for all M ∈ M do |
| 19:          permit ← SelectPermitDecisionFor(D, m) |
| 20:          permitA ← SelectAuditDecisionFor(A, m) |
| 21:          GroupedDecisions ← GroupedDecisions ∪ (t, decision, permit, permit) |
| 22:          GroupedDecisions ← GroupedDecisions ∪ (t, audit, permit, permitA) |
| 23:          deny ← SelectDenyDecisionFor(A, m) |
| 24:          denyA ← SelectDenyAuditFor(D, m) |
| 25:          GroupedDecisions ← GroupedDecisions ∪ (t, decision, deny, deny) |
| 26:          GroupedDecisions ← GroupedDecisions ∪ (t, audit, deny, denyA) |
| 27:          except ← SelectExceptDecisionFor(D, m) |
| 28:          exceptAudit ← SelectExceptAuditFor(A, m) |
| 29:          GroupedDecisions ← GroupedDecisions ∪ (t, decision, exceptional, except) |
| 30:          GroupedDecisions ← GroupedDecisions ∪ (t, audit, exceptional, exceptA) |
| 31:        end for |
| 32:     end for |
| 33: |
| 34:     CategorizedPartitions ← { }    -> Step 3: Categorize Partitions |
| 35:     for all ($t_1$, $t_2$, $t_3$, $t_4$) ∈ GroupedDecisions do |
| 36:        frequency ← ComputeFrequency(($t_1$, $t_2$, $t_3$, $t_4$)) |
| 37:        CategorizedPartitions ← CategorizedPartitions ∪ ($t_1$, $t_2$, $t_3$, $t_4$, frequency) |
| 38:     end for |
| 39:     return CategorizedPartitions |
| 40:   end procedure |

More specifically, access control policies (e.g., access control policies stored in database 130) can be evaluated (e.g., by audit result propagation module 142) by dividing its policies into actionable partitions that can be used to evaluate how policies underlying each partition are actually used (or abused) by users of the system. A partition of access control policies can be a particular combination of data upon which an access request can be evaluated by a computing device. For example, a partition can be a particular combination of data that, taken together, define a computer executable access privilege that can be evaluated in accordance with an underlying access control policy.

For example, policies of a role based access control (RBAC) model can be partitioned into combinations of roles and resources. For example, a role may be a nurse in a hospital and a resource may be patient records. Partitions of the access control model policies can include a set of role and resource combinations (e.g., $Role_A$, $RES_1$; $Role_A$ $RES_2$; . . . $Role_B$, $RES_1$; . . . ). Similarly, for example, policies of a Bell-LaPadula based access control model can be partitioned into combinations of clearance levels and objects with corresponding classification levels. For example, a clearance level may be SECRET and an object may be data records with a classification level of TOP SECRET. Partitions of the access control model policies can include a set of clearance level, classification level combinations (e.g., Clearance, $Class_1$; $Clearance_A$ $Class_2$; . . . $Clearnace_B$, $Class_1$; . . . ). Although implementations of the present disclosure can be applied to various types of access control models, for simplicity, the remainder of the disclosure will be described in reference to RBAC based models.

Access request data is obtained (e.g., from system log 108) and assigned to assigned to respective partitions. For example, each access request that is associated with a particular policy partition is assigned to that partition. The access request data (e.g., from the system log 108 or the audit trail log 110) can be used to determine a number of times that users submitted access requests related to each partition. For example, the request data can provide a number of times that a user assigned the role of nurse requested access to patient records. For example, the access request data may include one hundred requests to access patient records from nurses. Thus, the number of requests associated with the nurse/patient record partition would be 100. In addition, the access request data indicates access control decisions made for each partition. That is, the access control request data indicates whether access requests based on a particular partition were granted, denied, or granted under exceptional circumstances, for example.

The access control decisions associated with each partition can be used to assign access control types to each partition. Each partition of the policies can be assigned a one or more access types (e.g., PERMIT, DENY, EXCEPTIONAL) that indicates how access requests based on the partition were evaluated. For example, if a requests based on the partition was granted the partition is assigned an access type PERMIT, if requests based on the partition were denied the partition is assigned an access type DENY, and if requests based on the partition were granted under exceptional circumstance the partition is assigned an access type EXCEPTIONAL. For example, the nurse/patient record partition may be disallowed by a policy of the access control model, and would, therefore, be assigned an access type DENY. In some examples, a partition may be assigned multiple access control types. For example, access request based on the nurse/patient record partition may be disallowed 100 times, but allowed 10 times under exceptional circumstances. The nurse/patient record partition can, therefore, be assigned both access types DENY and EXCEP-TIONAL, where the DENY type occurs in the access request data 100 times and the EXCEPTIONAL type occurs 10 times.

In some examples, a frequency of access requests associated with each partition can be determined. For example, if the one hundred nurse requests to access patient records occurred over the course of a year, the access request frequency for the nurse/patient record partition would be 100/yr. The access request frequency can be evaluated over any appropriate time period (e.g., requests per audit cycle, requests per month, requests per day, etc.).

In some examples, audit data (e.g., from the audit result database 142) can be evaluated and assigned to appropriate partitions. For example, audit results related to a policy underlying a particular partition can be assigned to that partition. For example, if the policy related to nurses accessing patient records was audited (e.g., one or more access requests that apply to the policy may be reviewed in an audit), the results from the audit associated with that policy can be assigned to the nurse/patient record partition.

The partitions are categorized based on their access type and the number of requests related to the partition. In addition the access type and number of related requests, in some examples, the partitions are also categorized based on audit results. The categorized partitions can form the basis for determining whether, and if so, how to modify the policies underlying the partitions in order to improve the access control model. Furthermore, in some implementations, the policy can be automatically modified based on the categorized partitions. In some examples, the policy cannot be directly modified (e.g., due to regulations policy changes may require approval from a system administrator or policy expert). In such cases, recommendations can be provided to appropriate personnel (e.g., system administrators or policy experts) that include suggested modifications to a policy. In some examples, the policy can be automatically modified, but not implemented by the access control model until it is approved by an authorized user (e.g., a system administrator or policy expert). In such examples, the recommendation can include the modified policy and provide a means for the recipient (e.g., system administrator or policy expert) to approve the policy (e.g., a hyperlink to a policy approval page). In some cases, a partition may be categorized in multiple categories, for example, the nurse/patient record partition described above that was assigned both DENY and EXCEPTIONAL access types.

Figure 2:
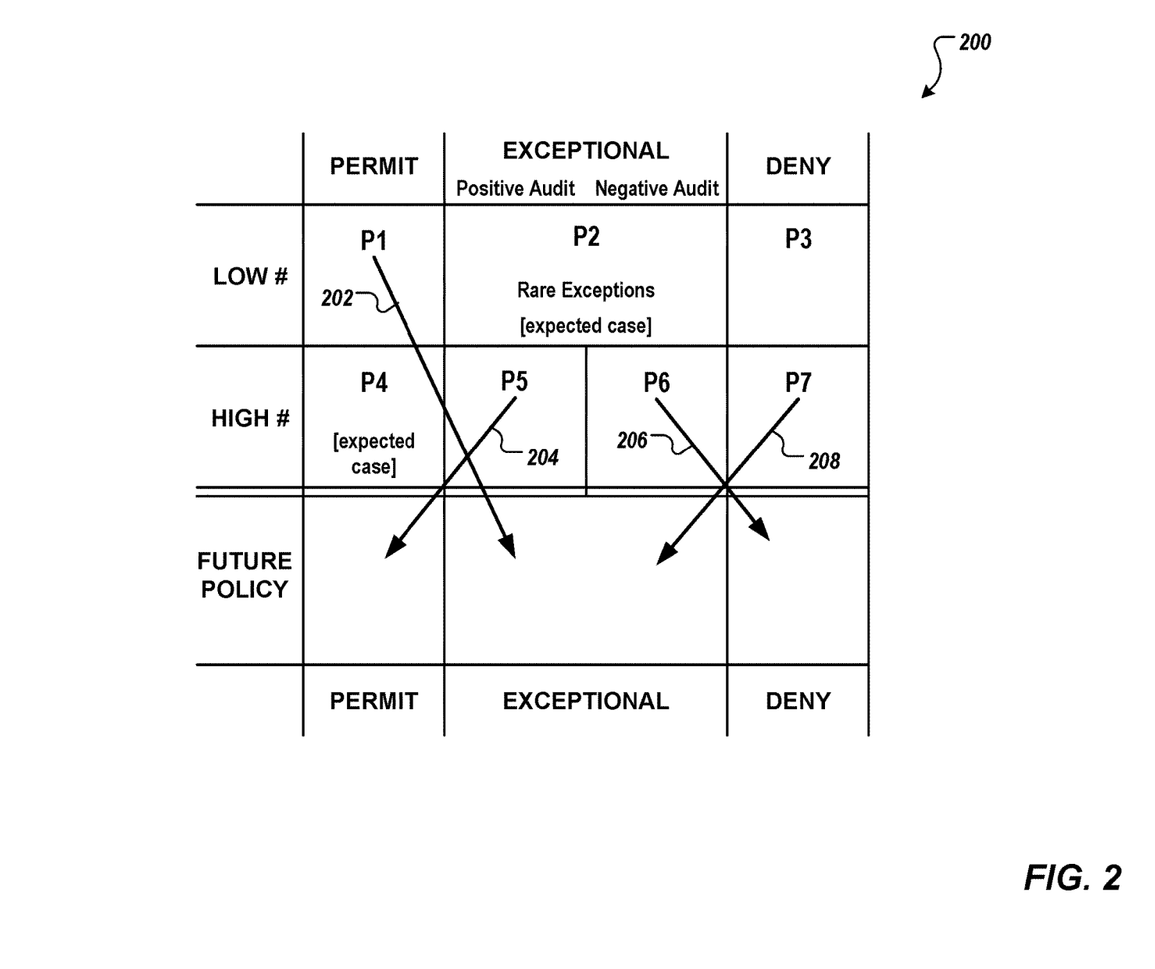
FIG. 2 depicts a chart of example categorized partitions of access control policies in accordance with implementations of the present disclosure.

FIG. 2 depicts a chart 200 of example categorized partitions of access control policies in accordance with implementations of the present disclosure. The chart 200 shows example categories for partitions. Specifically, in the examples, shown the partitions are categorized based on access type (e.g., PERMIT, EXCEPTIONAL, DENY) and number (or frequency) of access requests (e.g., LOW, HIGH). The EXCEPTIONAL access type partitions are further categorized based on audit results (e.g., Positive/Negative audit results), if available. In some examples, each classification (e.g., access type, number (frequency) of access requests, and audit results) can include more or fewer categories than those shown in FIG. 2. For example, the number of access requests can include not only HIGH and LOW categories, but also a MEDIUM category. Similarly, in some examples, an access control model may not include an EXCEPTIONAL access type.

For example, partition P1 is categorized as a PERMIT access type with a LOW number of access requests. Partition P2 is categorized as an EXCEPTIONAL access type with a LOW number of access requests. Partition P3 is categorized as a DENY access type with a LOW number of access requests. Partition P4 is categorized as a PERMIT access type with a HIGH number of access requests. Partitions P5 and P6 are categorized as EXCEPTIONAL access types with HIGH numbers of access requests. And, partition P7 is categorized as a DENY access type with a HIGH number of access requests.

In some examples, partitions that are categorized as either PERMIT/HIGH, EXCEPTIONAL/LOW, and DENY/LOW are considered to be expected results or the optimal cases for an access control system. In other words, if the policies of an access control model are effectively matched with the actual needs of an organization the PERMIT policies will have a relatively high level of use and the EXCEPTIONAL and DENY policies will have a relatively low level of use. Thus, as shown in FIG. 2, partitions P2, P3, and P4 may be considered, in some examples, to be well functioning policies, and therefore not in need of modifications. Therefore, these partitions would not require any further evaluation and may be ignored by the audit result propagation module 142.

On the other hand, partitions P1, P5, P6, and P7 each fall outside of the expected (or optimal) categories and can be evaluated further. For example, partition P1 indicates a policy that, while it permits access to a resource by a particular role, is not used often. For instance, partition P1 indicates a policy with low activity and which might be outdated. That is, new resources in the enterprise system or access control system may be available that have reduced the need for the policies underlying partition P1. In some examples, policies associated with partitions falling in the PERMIT/LOW category, such as partition P1, can be changed from PERMIT type access policies to EXCEPTIONAL type access policies as indicated by arrow 202. For example, changing the policy associated with partition P1 to an EXCEPTIONAL access type may allow users to still execute the process, if needed, and also force them to consider updated alternatives or informs them about the updated alternatives.

The example partitions P5 and P6 indicate policies that may have been expected to be used only in exceptional circumstances, but are actually used regularly. In some examples, first order solution to such policies can be to make them regular access policies (PERMIT type access), at least, for the group of uses that regularly requests access. However, audit data (if available) can be used to provide a more detailed evaluation of the policies associated with partitions P5 and P6. For example, regular access requests to exceptional access policies may indicate either that access to a particular resource is required more often than expected for normal business operations (e.g., P5), or that exceptional access privileges are being abused (e.g., P6).

For example, the nurse/patient document partition discussed above may be established as an exceptional access privilege. That is, a hospital may permit nurses to access patient records in exceptional circumstances, such as during emergency situations when emergency room physicians (who may have regular access permission) must rely on their nurses to access and add notes to the patient records. Such situations indicate a positive use of the exceptional access policy, and may be associated with positive audit results (partition P5). Conversely, nurses using the exceptional access privilege to view records of patients for personal reasons (e.g., out of curiosity because a particular patient is famous), may be considered an abuse of the access policy and, consequently, be associated with negative audit results (partition P6).

In some examples, policies associated with partitions falling in the EXCEPTIONAL/HIGH category and having positive audit results, such as partition P5, can be changed from EXCEPTIONAL type access policies to PERMIT type access policies as indicated by arrow 204. For example, the policy associated with partition P5 can be changed to a PERMIT access type, at least, for the group(s) (roles) of users that require regular access to the corresponding resource (e.g., nurses generally or emergency room nurses).

In some examples, policies associated with partitions falling in the EXCEPTIONAL/HIGH category but having negative audit results, such as partition P6, can be changed from EXCEPTIONAL type access policies to DENY type access policies as indicated by arrow 206. For example, the policy associated with partition P6 can be changed to a DENY access type, if most or all the audit results are negative. In some examples, policies associated with partitions falling in the EXCEPTIONAL/HIGH category may require even further evaluation. For example, there may be a significant number of positive audit results associated with such partitions as well as negative results. In such situations, a recommendation can be provided to a system administrator or policy expert to conduct a further review of the policy, or investigate users who may be abusing the policy. In some examples, the recommendation can include a suggested modification to the policy. For example, the suggested modification can include changing the policy to a DENY access type or restricting the access to more restricted user roles (e.g., instead of allowing exceptional access to nurses generally, only granting exceptional access to emergency room nurses).

The example partition P7 indicates a policy that, while it denies access to a resource by a particular role, the resource is requested often. For instance, partition P7 indicates a policy with high activity but restricted resources. Partitions falling in this category of DENY/HIGH may indicate a problem with existing processes or policies. That is, users may be blocked in their work by overly restrictive policies, or may be assigned tasks that require access to resources to which they are not authorized to use.

In some examples, policies associated with partitions falling in the DENY/HIGH category, such as partition P7, can be changed from DENY type access policies to EXCEPTIONAL type access policies as indicated by arrow 208. For example, the policy associated with partition P7 can be changed to an EXCEPTIONAL access type, and restricted to specific users. In some examples, policies associated with partitions falling in the DENY/HIGH category may require even further evaluation to determine whether the apparently high demand for access is due to an overly restrictive policy or in appropriate access requests. In such situations, a recommendation can be provided to a system administrator or policy expert to conduct a further review of the policy, and/or review employee work assignments. In some examples, the recommendation can include a suggested modification to the policy. For example, the suggested modification can include changing the policy to an EXCEPTIONAL access type and restrict access to specific users or roles. In some examples, the suggested modification can include changing the policy to a PERMIT access type and restrict access to specific users or roles who legitimately need access to the associated resource and would are otherwise authorized to access the resource (e.g., in accordance with company policies or government regulations).

Figure 3:
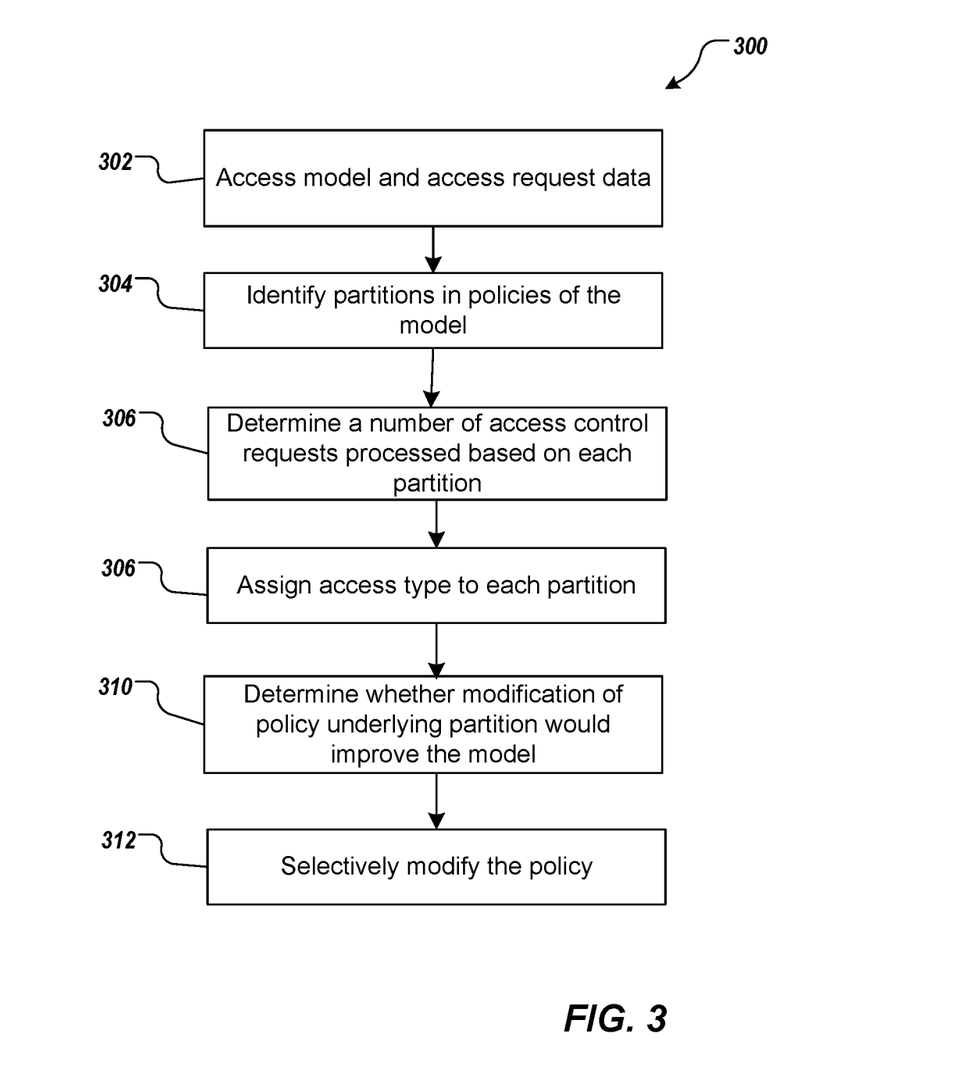
FIG. 3 depicts an example process that can be executed in accordance with implementations of the present disclosure

FIG. 3 is a flowchart illustrating an example process 300 that can be executed in accordance with implementations of the present disclosure. In some implementations, the example process 300 can be realized using one or more computer-executable programs that are executed using one or more computing devices.

An access control model and access request data are accessed (302). For example, and with reference to FIG. 1, the policy monitoring and modification system 106 can access the access control model 104 to obtain an access control policy from the access control policy database 130. In addition, the policy monitoring and modification system 106 can access the access request data from the system log 108 or the audit trail log 110. The access request data can include data indicating results of access control requests that have been processed (e.g., by PDP 132 or a PEP 120) in accordance with one or more access control policies of the electronic access control model. Partitions in the access control policy are identified (304). For example, each partition can be a particular combination of data that, taken together, define a computer executable access privilege. For example, policies of an RBAC model can be partitioned into combinations of roles and resources, or policies of a Bell-LaPadula based access control model can be partitioned into combinations of clearance levels and objects with corresponding classification levels. A number of access control requests that have been processed for each partition is determined (306). For example, the access request data can be used to determine a number of times that users submitted access requests related to each partition. An access type is assigned to each partition (308). For example, each partition can be assigned one or more access types (e.g., PERMIT, DENY, EXCEPTIONAL) that indicates how access requests based on the partition were evaluated by an access control policy of the model.

Based on the access type and number of access control requests, it is determined whether a modification to a respective policy underlying each partition would improve the access control policy (310), and, if so, the partition is selectively modified (312). For example, the partitions can be categorized based on their access type and the number of requests related to the partition (e.g., as shown in FIG. 2). In some examples, the partitions can be further categorized based on audit results related to policies associate with the partitions. The partitions can be evaluated to determine whether, and if so, how to modify the policies underlying the partitions can be modified in order to improve the access control model. In some implementations, the policy can be automatically modified based on the categorized partitions. In some examples, the policy cannot be directly modified (e.g., due to regulations policy changes may require approval from a system administrator or policy expert). In such cases, recommendations can be provided to appropriate personnel (e.g., system administrators or policy experts) that include suggested modifications to a policy. In some examples, the policy can be automatically modified, but not implemented by the access control model until it is approved by an authorized user (e.g., a system administrator or policy expert). In such examples, the recommendation can include the modified policy and provide a means for the recipient (e.g., system administrator or policy expert) to approve the policy (e.g., a hyperlink to a policy approval page).

Figure 4:
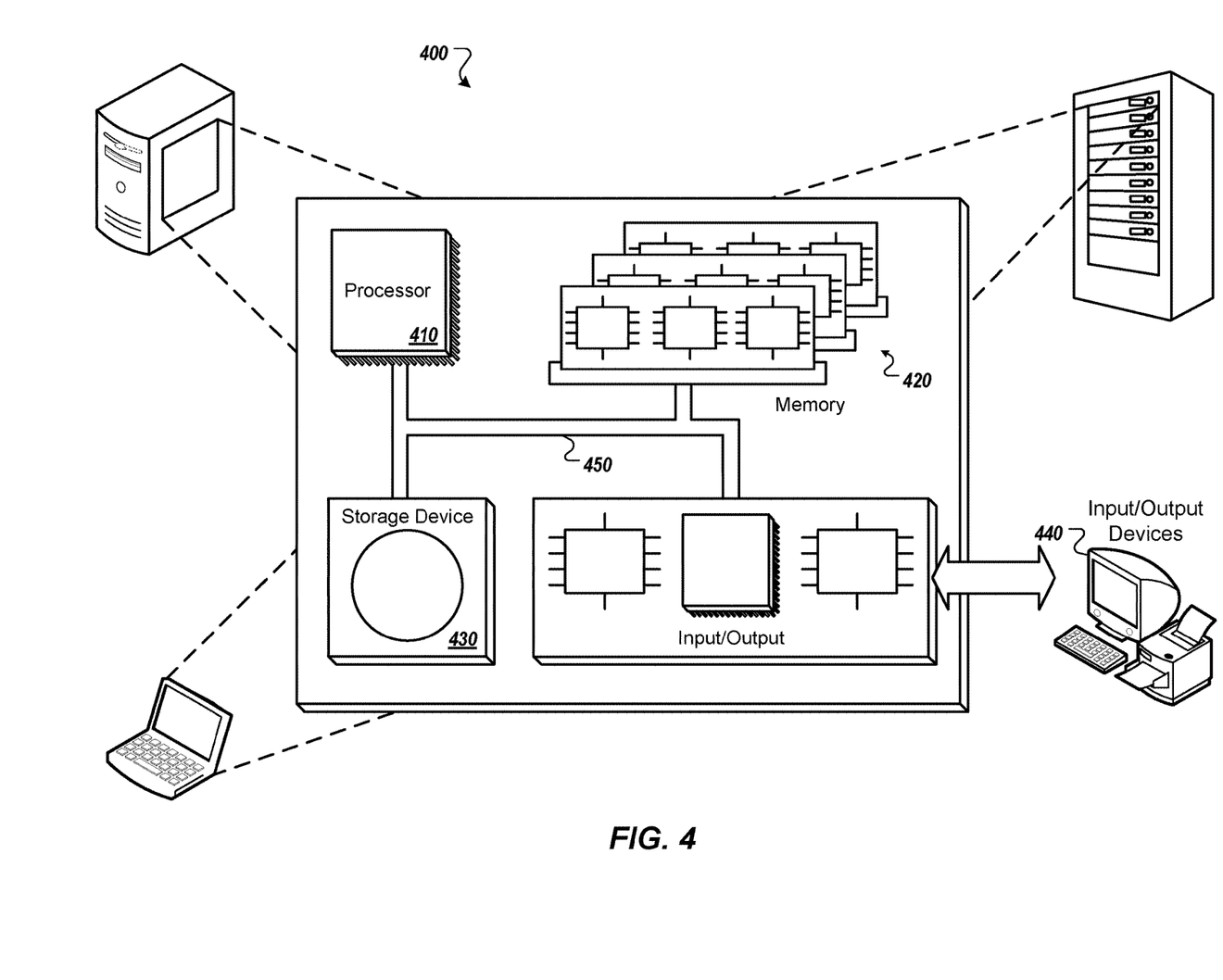
FIG. 4 is a schematic illustration of example computer systems that can be used to execute implementations of the present disclosure.

FIG. 4 is a schematic illustration of example computer systems 400 that can be used to execute implementations of the present disclosure. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for improving efficiency of electronic access controls, the method being executed by one or more processors and comprising:
   accessing, by the one or more processors, an electronic access control model and data indicating results of access control requests that have been processed in accordance with an access control policy of a plurality of access control policies of the electronic access control model, the electronic access control model being configured to determine whether to grant access to a user requesting access to a particular system resource based on one or more of the plurality of access control policies, the plurality of access control policies being adaptable to actual uses and requirements of an enterprise access system;
   obtaining audit results associated with the plurality of access control policies of the electronic access control model, the audit results comprising information gained from system audits of past access control decisions of the electronic access control model;
   identifying, by the one or more processors, a plurality of partitions in the electronic access control model, each partition representing one or more access criteria of the electronic access control model that, taken together, define a computer executable access privilege; and
   for each partition:
      determining, based on the data, a number of access control requests processed based on the partition;
      determining which, if any, of the audit results are associated with the partition, based on whether one of the audit results is associated with one or more access requests that were processed based on the partition;
      assigning an access type to the partition; and
      determining, based on the access type of the partition, the number of access control requests processed based on the partition, and any audit results associated with the partition, whether a modification of the access control policy would improve the electronic access control model by removing potential access violations to increase a security and a flexibility of the electronic access control model, and if so, selectively modifying the access control policy.

2. The method of claim 1, further comprising for each partition, determining, based on the number of access control requests processed based on the partition, a frequency with which access control requests processed based on the partition, and
   wherein the determination of whether the modification of the access control policy underlying the partition would improve the electronic access control model is based on the access type and the frequency of the partition.

3. The method of claim 1, wherein selectively modifying the access control policy comprises one of:
   a modification to change the access type of the access control policy from EXCEPTIONAL to PERMIT that defines actions that are allowed for a particular user,
   a modification to change the access type of the access control policy from EXCEPTIONAL to DENY that defines actions that are disallowed for the particular user,
   a modification to change a role of the particular user associated with the access control policy, or
   a modification to change the access type of the access control policy from PERMIT to EXCEPTIONAL that defines actions that are allowed for the particular user in exceptional circumstances.

4. The method of claim 1, further comprising in response to determining that modification of the access control policy underlying the partition would improve the electronic access control model, providing a recommendation to modify the access control policy.

5. The method of claim 4, wherein the recommendation comprises one of:
   a recommendation to change the access type of the access control policy from EXCEPTIONAL to PERMIT that defines actions that are allowed for a particular user,
   a recommendation to change the access type of the access control policy from EXCEPTIONAL to DENY that defines actions that are disallowed for the particular user,
   a recommendation to change a role associated with the access control policy,
   a recommendation to consider exceptional permissions to a specific role or specific users, or
   a recommendation to change the access type of the access control policy from PERMIT to EXCEPTIONAL that defines actions that are allowed for the particular user in exceptional circumstances.

6. The method of claim 1, wherein the data indicating results of access control requests having been processed in accordance with the access control policy is obtained from an access control log.

7. The method of claim 1, wherein the data indicating results of access control requests having been processed in accordance with the access control policy is obtained from an audit log.

8. The method of claim 1, wherein the electronic access control model is a role-based access control model.

9. The method of claim 8, wherein at least one partition comprises a role and a resource.

10. The method of claim 1, wherein the access type comprises one of PERMIT access that defines actions that are allowed for a particular user, DENY access that defines actions that are disallowed for the particular user, or EXCEPTIONAL access defines actions that are allowed for the particular user in exceptional circumstances.

11. The method of claim 1, wherein the electronic access control model is a Bell-LaPadula based access control model.

12. The method of claim 11, wherein at least one partition comprises a clearance level and an object with a classification level.

13. A system for improving efficiency of electronic access controls, the system comprising:
one or more computers; and
a computer-readable medium coupled to the one or more computers having instructions stored thereon which, when executed by the one or more computers, cause the one or more computers to perform operations, the operations comprising:
accessing an electronic access control model and data indicating results of access control requests that have been processed in accordance with an access control policy of a plurality of access control policies of the electronic access control model, the electronic access control model being configured to determine whether to grant access to a user requesting access to a particular system resource based on one or more of the plurality of access control policies, the plurality of access control policies being adaptable to actual uses and requirements of an enterprise access system;
obtaining audit results associated with the plurality of access control policies of the electronic access control model, the audit results comprising information gained from system audits of past access control decisions of the electronic access control model;
identifying a plurality of partitions in the electronic access control model, each partition representing one or more access criteria of the electronic access control model that, taken together, define a computer executable access privilege; and
for each partition:
determining, based on the data, a number of access control requests processed based on the partition;
determining which, if any, of the audit results are associated with the partition, based on whether one of the audit results is associated with one or more access requests that were processed based on the partition;
assigning an access type to the partition; and
determining, based on the access type of the partition, the number of access control requests processed based on the partition, and any audit results associated with the partition, whether a modification of the access control policy would improve the electronic access control model by removing potential access violations to increase a security and a flexibility of the electronic access control model, and if so, selectively modifying the access control policy.

14. The system of claim 13, wherein the operations further comprise for each partition, determining, based on the number of access control requests processed based on the partition, a frequency with which access control requests processed based on the partition, and
wherein the determination of whether the modification of the access control policy underlying the partition would improve the electronic access control model is based on the access type and the frequency of the partition.

15. The system of claim 13, wherein selectively modifying the access control policy comprises one of:
a modification to change the access type of the access control policy from EXCEPTIONAL to PERMIT that defines actions that are allowed for a particular user,
a modification to change the access type of the access control policy from EXCEPTIONAL to DENY that defines actions that are disallowed for the particular user,
a modification to change a role of the particular user associated with the access control policy, or
a modification to change the access type of the access control policy from PERMIT to EXCEPTIONAL that defines actions that are allowed for a particular user in exceptional circumstances.

16. The system of claim 13, wherein the operations further comprise in response to determining that modification of the access control policy underlying the partition would improve the electronic access control model, providing a recommendation to modify the access control policy.

17. The system of claim 16, wherein the recommendation comprises one of:
a recommendation to change the access type of the access control policy from EXCEPTIONAL to PERMIT that defines actions that are allowed for a particular user,
a recommendation to change the access type of the access control policy from EXCEPTIONAL to DENY that defines actions that are disallowed for the particular user,
a recommendation to change a role associated with the access control policy,
a recommendation to consider exceptional permissions to a specific role or specific users, or
a recommendation to change the access type of the access control policy from PERMIT to EXCEPTIONAL that defines actions that are allowed for the particular user in exceptional circumstances.

18. The system of claim 13, wherein the data indicating results of access control requests having been processed in accordance with the access control policy is obtained from an access control log.

* * * * *